United States Patent

Bierman

[11] Patent Number: 5,279,251
[45] Date of Patent: Jan. 18, 1994

[54] BIDIRECTIONAL PIPELINE PIG SIGNALING DEVICE

[75] Inventor: Paul E. Bierman, Sparks, Okla.

[73] Assignee: TDW Delaware, Inc., Wilmington, Del.

[21] Appl. No.: 991,197

[22] Filed: Dec. 16, 1992

[51] Int. Cl.⁵ .............................................. G01D 5/06
[52] U.S. Cl. .................................................. 116/204
[58] Field of Search ............... 116/204, 267, 271, 284, 116/285, 303

[56] References Cited

U.S. PATENT DOCUMENTS

| | | | |
|---|---|---|---|
| 3,109,410 | 11/1963 | Ver Nooy | 116/303 |
| 3,327,677 | 6/1967 | King | 116/303 |
| 3,646,906 | 3/1972 | Hammer | 116/267 |
| 3,815,542 | 6/1974 | Cooper | 116/70 |
| 4,596,204 | 6/1986 | Ralls | 116/303 |
| 4,638,278 | 1/1987 | Bullock | 335/207 |
| 4,714,888 | 12/1987 | French et al. | 324/326 |
| 4,857,851 | 8/1989 | Anderson et al. | 324/326 |

FOREIGN PATENT DOCUMENTS

| | | | |
|---|---|---|---|
| 1492312 | 7/1967 | France | 116/204 |
| 1407815 | 9/1975 | United Kingdom | 116/204 |

*Primary Examiner*—William A. Cuchlinski, Jr.
*Assistant Examiner*—W. Morris Worth
*Attorney, Agent, or Firm*—Head & Johnson

[57] ABSTRACT

The present invention is a signaling device for indicating passage of a pig through a pipeline. The device attaches to the pipeline by means of a nipple welded to the pipeline. As a pig travels past the device, an actuator of the device which hangs down into the pipeline is pushed upward by the pig. The actuator causes a spring biased plunger located within the device to move upward, causing a polar magnet attached to the plunger's upper end to approach a rotatable magnetic indicator ball. The ball is colored black on an upper half which is initially visible through a clear dust cover provided on the device and is colored yellow on a lower half. The upper half of the ball is of opposite polarity and the lower half is of like polarity to the polar magnet. As the polar magnet approaches the rotatable magnetic ball, the yellow half of the magnetic indicator ball is repelled by the like polarity of the polar magnet, causing the magnetic indicator ball to rotate 180 degrees so that the yellow half is now visible through the dust cover. After the pig has passed, the plunger springs back to its original lower position and the ball can be reset to its original position by means of a reset lever attached to the ball. An alternate embodiment replaces the magnetic indicator ball with a proximity switch which is activated when the polar magnet approaches the proximity switch as the plunger moves upward.

11 Claims, 2 Drawing Sheets

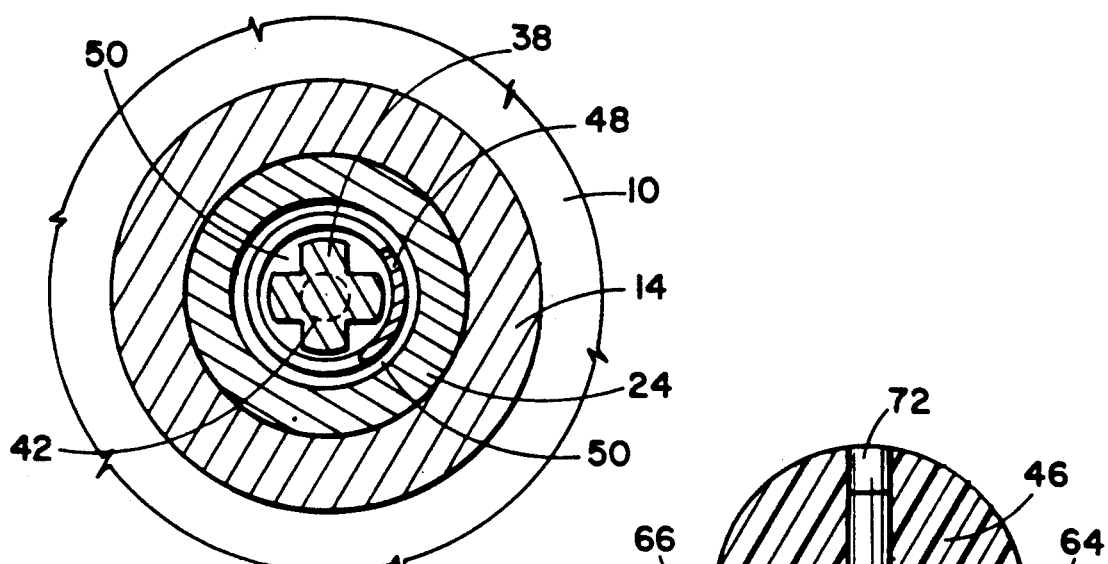
*Fig. 3*
*Fig. 4*
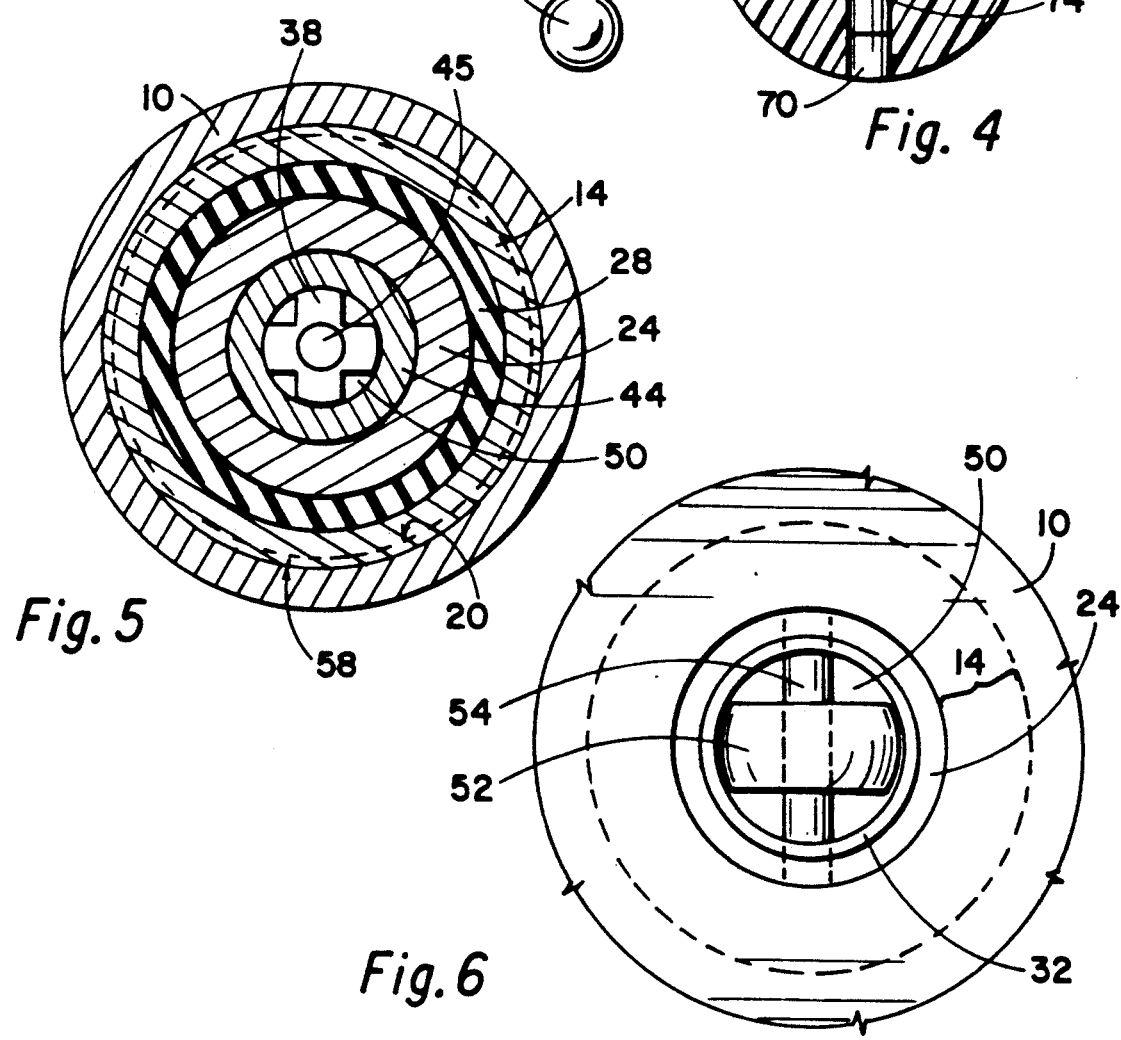
*Fig. 5*
*Fig. 6*

BIDIRECTIONAL PIPELINE PIG SIGNALING DEVICE

BACKGROUND OF THE INVENTION

1. Field of the Invention

The present invention relates to a device for detecting and signaling the passage of a pig past a point in a pipeline. More specifically, the present invention relates to a device employing a magnetic field to initiate either a visual or an electronic signal to indicate passage of the pig.

2. Description Of The Related Art

In the pipeline industry it is common practice to utilize a movable plug or a pig (hereinafter referred to as a pig) within a pipeline either to travel between and separate different products as they flow consecutively through a single pipeline or to travel through the pipeline in order to service it by cleaning it, mapping it, etc. Whenever a pig is being used, it is necessary to be able to detect its location. One way this is done is to utilize a device which remains stationary relative to the pipeline and is provided with means for detecting and signaling passage of the pig past the device.

Previous devices for detecting and signaling passage of a pig can be categorized as one of two general types. The first type, as exemplified by U.S. Pat. No. 3,109,410 issued on Nov. 5, 1963 to inventor Burton Ver Nooy, employs a trigger mechanism internally disposed within the pipeline which is physically tripped by passage of a pig. The physical movement of the trigger is transmitted by a variety of gears or other types of mechanical means through a sealing mechanism in an enclosure of the device to a signaling device located exterior to the enclosure.

One of the main problems with this type of device is that leakage occurs around the movable element which connects the internal trigger to the external signaling device. This type of device can be problematic because of its sealing method when used on high pressure pipelines and when used on pipelines transporting materials corrosive to the materials used in the sealing mechanism.

The second type of device for detecting and signaling passage of a pig is represented by U.S. Pat. No. 4,638,278 issued on Jan. 20, 1987 to inventor Mark E. Bullock. This second type of device employs a specially designed pig, usually one to which magnets have been attached. This special pig is magnetically detected by a sensing unit located external to the pipeline. The sensing unit normally employs a magnetically triggered switch which can be used to operate a signaling device.

One of the main problems with this type of device is that the pig must be constructed of a magnetically detectable material or must be retrofitted with magnetically detectable material, such as magnets, in order for the sensing unit to detect its passage. Use of magnetically detectable material in a pig adds to the pig's weight and the magnetically detectable material can be chemically degraded by corrosive materials contained within the pipeline.

The present invention addresses these problems by providing a device which combines the reliability of mechanical triggering with the non-intrusiveness of magnetic sensing. Specifically, the present invention utilizes an enclosed and sealed trigger mechanism provided with a polar magnet on its upper end and provided with an actuator on its lower end which extends down into the pipeline. A passing pig engages the actuator, causing the trigger mechanism and the attached polar magnet to move upward where a magnetic field associated with the polar magnet passes through a sealed enclosure housing the trigger mechanism and can either activate a visual signal device or, optionally, can activate a proximity switch.

SUMMARY OF THE INVENTION

The present invention is a signaling device which attaches to a pipeline by means of a hollow nipple which is welded to the pipeline and which opens to an interior of the pipeline. A plug assembly, having a closed upper end and an open lower end, screws into the nipple and seals with the nipple by means of an O-ring provided in a groove extending around the plug assembly. A chamber is provided within the plug assembly and opens downward into the pipeline at the plug assembly lower end. The chamber contains a movable plunger having a cylindrical polar magnet at its upper magnetic end and an actuator attached at its lower actuator end. The actuator attaches by means of a pin so that the actuator extends down into the pipeline when the plunger is in its lower position. A spring encircles the plunger, with one end of the spring abutting a retainer toroid and the other end abutting a seal adjacent the plunger's lower actuator end. The retainer toroid is positioned in the chamber so that it encircles the plunger's upper magnetic end when the plunger is in its lower position.

A cap assembly screws onto the nipple and is provided with a clear convex shaped dust cover through which a person can view into an internal cavity provided in the cap assembly. A magnetic indicator ball rotatably mounts inside the internal cavity by means of a lever arm which attaches to one side of the ball and movably extends through an opening in the cap assembly, terminating at a reset lever, and by means of an ear which attaches to an opposite side of the ball and movably extends through a second opening in the cap assembly. First and second polar ball magnets are located opposite each other on the ball, and a bar of magnetic material extends through the ball and abuts against the polar ball magnets. The first and second polar ball magnets are oriented perpendicular to the ear and lever arm, and like poles of the first and second polar ball magnets are aligned in the same direction. Also, the ball magnets are oriented so that the magnetic pole which faces outward from the ball on the first polar ball magnet is of the same polarity as the cylindrical polar magnet, and the magnetic pole which faces outward from the ball on the second polar ball magnet is of opposite polarity to the cylindrical polar magnet. The upper end of the plug assembly is provided with an area of magnetic material which attracts whichever polar ball magnet is closest to it, thus, discouraging rotation of the ball.

A lower half of the ball is colored yellow and an upper half of the ball is colored black so that the intersection of the two halves forms a diameter which intersects the ear and the lever arm and is perpendicular to the bar and polar ball magnets.

Initially, the ball is set by means of the reset lever so that the black upper half of the ball is visible through the dust cover. As a pig travels through the pipeline it forces the actuator upward, causing the plunger to travel upward until it reaches its most upward position and causing the cylindrical polar magnet to be moved upward out of the magnetic influence of the retainer toroid. A magnetic field associated with the cylindrical polar magnet repels the first polar ball magnet, causing the ball to rotate 180 degrees so that the yellow lower half is visible through the dust cover. The plunger returns to its original lower position by means of force exerted on it by the spring, but the ball will remain with the lower yellow half visible through the dust cover until reset by means of the reset lever. Alternately, a proximity switch, an electrical switch which is activated in response to the magnetic field of the cylindrical polar magnet, can be substituted instead of the ball to provide an electrical, rather than a visual, indication of the passage of a pig through the pipeline.

BRIEF DESCRIPTION OF THE DRAWINGS

FIG. 3 is a cross-sectional view taken along line 3—3 of FIG. 2.

FIG. 4 is a cross-sectional side elevation of the magnetic ball indicator with the reset lever attached.

FIG. 5 is a cross-sectional view taken along line 5—5 of FIG. 2.

FIG. 6 is a bottom elevation of the signaling device taken along line 6—6 of FIG. 2.

DETAILED DESCRIPTION OF THE PREFERRED EMBODIMENT

Figure 1:
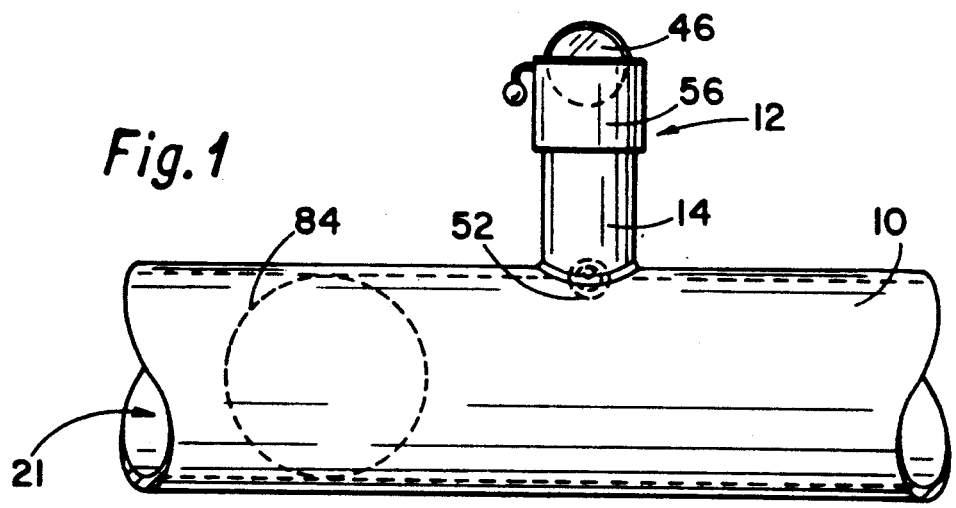
FIG. 1 is a diagrammatic side elevation of a pipeline to which is attached a bidirectional pipeline pig signaling device constructed according to a preferred embodiment of the present invention.
Figure 2:
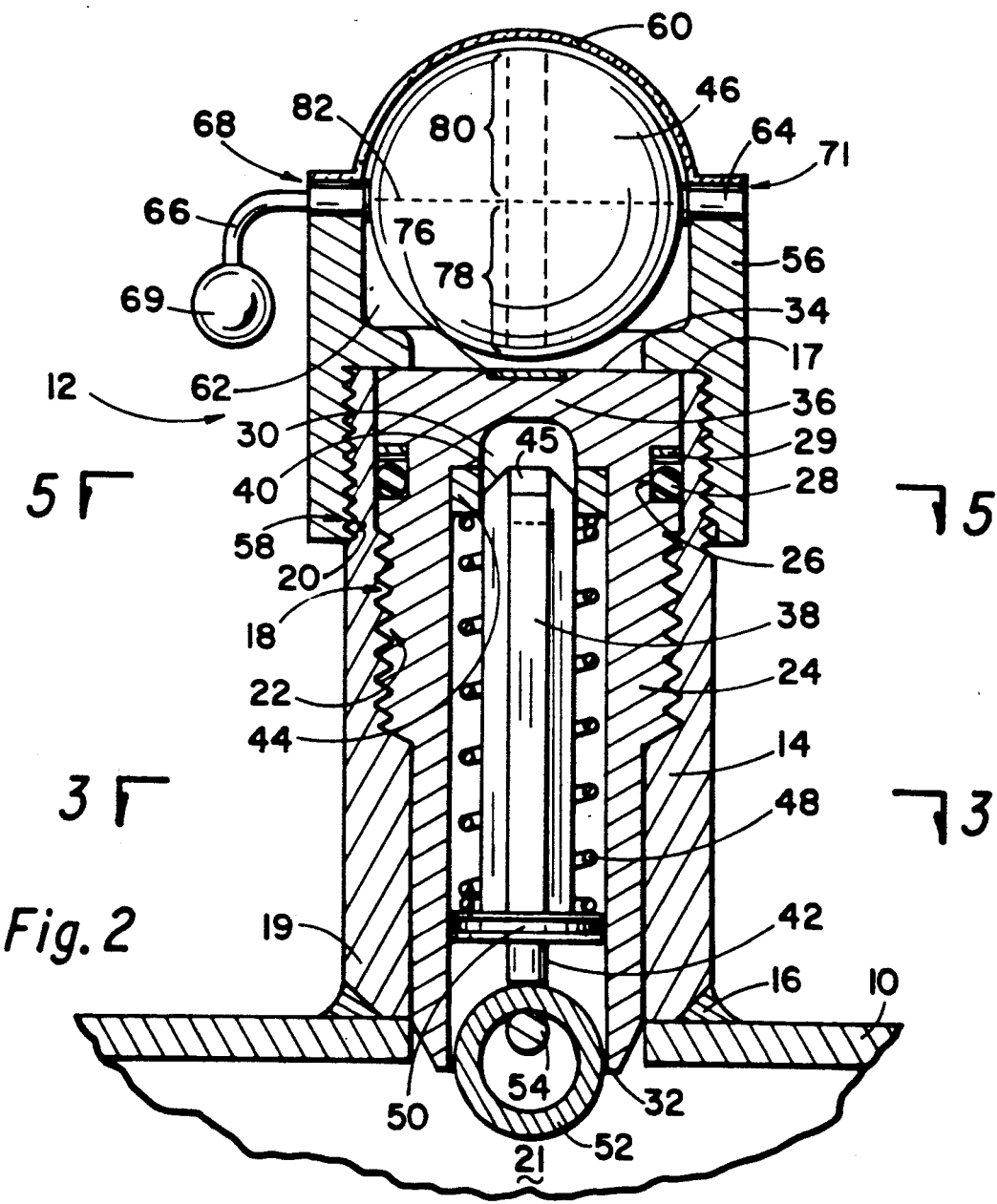
FIG. 2 is an enlarged cut-away side elevation of the signaling device of FIG. 1.

Referring now to the drawings and initially to FIG. 1, there is illustrated a pipeline 10 to which a bidirectional pipeline pig signaling device 12 is attached. FIG. 2 shows a hollow nipple 14 for the signaling device 12 attaching to the pipeline 10 by means of a weld 16 or other suitable attachment means. The nipple 14 has an upper open end 17 extending upward perpendicularly to the pipeline 10 and has an opposite lower open end 19 which is welded to the pipeline 10 and which communicates with an internal area 21 of the pipeline 10. The nipple 14 is provided with female nipple threads 18 and with male nipple threads 20. The female nipple threads 18 engage with male plug assembly threads 22 provided on a plug assembly 24 located within the nipple 14 to secure the plug assembly 24 to the nipple 14. A groove 26 is provided around the plug assembly 24 and located above the male plug assembly threads 22. As illustrated in FIGS. 2 and 5, an O-ring 28 is held in the groove 26 by means of a retainer ring 29 as a means to seal between the nipple 14 and the plug assembly 24. The O-ring 28 which seals between the nipple 14 and the plug assembly 24 is capable of withstanding high pressures such as those encountered within the pipeline 10.

Referring again now to FIG. 2, the plug assembly 24 has an internal chamber 30 which opens downward at a lower end 32 of the plug assembly 24, with an upper end 34 of the plug assembly forming a closed ceiling 36 over the chamber 30.

A plunger 38 is movably provided within the chamber 30. The plunger 38 is provided with an upper magnetic end 40, which is located adjacent the ceiling 36, and a lower actuator end 42 extending downward toward the pipeline 10. The upper magnetic end 40 is provided with a small cylindrical polar magnet 45. A retainer toroid 44 is provided in the chamber 30 so that it encircles the magnetic end 40 of the plunger 38 when the plunger is in the lower position, as illustrated in FIG. 2. The retainer toroid 44 is constructed of a magnetic material and serves to keep a magnetic field (not illustrated) associated with the cylindrical polar magnet 45 from reaching upward to a magnetic indicator ball 46, which will be hereinafter described. A spring 48 encircles the plunger 38 and extends upward to the retainer toroid 44 and downward to a seal 50 provided on the plunger 38 adjacent the actuator end 42. As best seen in FIG. 3, the spring 48 is movably located within the chamber 30 and between the plunger 38 and the plug assembly 24.

As illustrated in FIGS. 2 and 6, the actuator end 42 of the plunger 38 is provided with an actuator 52 which is secured to the plunger 38 by means of a pin 54. The pin 54 also prevents the plunger 38 from being pushed by the spring 48 out of the chamber 30 and into the internal area 21 of the pipeline 10. When the plunger 38 is its lower position, as shown in FIG. 2, the actuator 52 extends beyond the lower end 32 of the plug assembly 24 and into the internal area 21 of the pipeline 10.

A cap assembly 56 secures to the nipple 14 by means of female cap assembly threads 58 provided on the cap assembly 56 which engage the male nipple threads 20. The cap assembly 56 is provided with a clear convex or dome-shaped dust cover 60 through which a person (not shown) can look to view inside an internal cavity 62 which is provided within the cap assembly 56. The magnetic indicator ball 46 is rotatably mounted within the internal cavity 62 so that an upward facing half of the magnetic indicator ball 46 is visible to a person (not shown) via the dust cover 60. The magnetic indicator ball 46 rotatably mounts within the internal cavity 62 on an attached ear 64 secured to one side of the magnetic indicating ball 46 and on a lever arm 66 secured to an opposite side of the magnetic indicator ball 46. The lever arm 66 rotatably extends through an opening 68 provided in the dust cover 60 and terminates at a reset level 69. Likewise, the ear 64 rotatably extends through a second opening 71 provided in the dust cover 60.

Referring now to FIGS. 2 and 4, the magnetic indicator ball 46 is preferably made of a material having a low mass, such as plastic, in order that the magnetic indicator ball 46 can be rotated easily. The magnetic indicator ball 46 is provided with first and second polar ball magnets 70 and 72 located opposite each other on the magnetic indicator ball 46 and perpendicular to the ear 64 and the lever arm 66. The polar ball magnets 70 and 72 have their poles oriented in the same direction, with one pole of the first polar ball magnet 70 facing outward on the magnetic indicator ball 46 and an opposite pole of the second polar ball magnet 72 facing outward on the magnetic indicator ball 46 at a location 180 degrees from the first polar ball magnet 70. For example, if a south pole of the first polar ball magnet 70 faced outward, then a north pole of the second polar ball magnet 72 would face outward. Likewise, if a north pole of the first polar ball magnet 70 faced outward, then a south pole of the second polar ball magnet 72 would face outward.

Additionally, a magnetic field (not illustrated) associated with the cylindrical polar magnet 45 is of like polarity to an outward facing pole of the first polar ball magnet 70 and of opposite polarity to an outward facing pole of the second polar ball magnet 72. A bar 74 composed of highly magnetic material extends through the magnetic indicator ball 46 and between inward facing poles of the polar ball magnets 70 and 72. The upper end 34 of the plug assembly 24 is provided with an area 76 consisting of magnetic material which is attracted to whichever polar ball magnet, 70 or 72, is located proximal to it and, thus, tends to discourage rotation of the magnetic indicator ball 46 by holding the magnetic indicator ball 46 so that one of the polar ball magnets, either 70 or 72, is oriented downward and one of the polar ball magnets, either 72 or 70, is oriented upward.

A lower half 78 of the magnetic indicator ball 46 is preferably bright fluorescent yellow in coloration and an upper half 80 of the magnetic indicator ball 46 is preferably black in coloration so that an interface 82 formed between the lower half 78 and the upper half 80 forms a diameter around the magnetic indicator ball 46 which intersects with the ear 64 and the lever arm 66 and which is perpendicular to the bar 74 connecting polar ball magnets 70 and 72 and perpendicular to the polar bar magnets 70 and 72. The colors or patterns of the lower half 78 and upper half 80 may vary so long as the lower half 78 is visually distinct from the upper half 80.

Initially, the bidirectional signaling device 12 is set by means of the reset lever 69 so the black upper half 80 is visible through the dust cover 20. The actuator 52 initially extends downward into the pipeline 10 as shown in FIGS. 1 and 2. The spring 48 serves to maintain the plunger 38 in its lower position until a pig 84 traveling through the pipeline 10 encounters the actuator 52, forcing it upward. The actuator 52 is designed to be forced upward regardless of which direction the pig is traveling through the pipeline 10. Upward movement of the actuator 52, in turn, forces the plunger 38 to an upward position (not illustrated) in which the cylindrical polar magnet 45 moves upward in the chamber 30 with the plunger 38 until the cylindrical polar magnet 45 abuts the ceiling 36. The plunger 38 is held in its upward position by means of hydraulic pressure for a brief period of time after the pig 84 passes beyond the actuator 52 before it is forced back down to its lower position by the spring 48. When the plunger 38 is in its upward position and the cylindrical polar magnet 45 is forced upward against the ceiling 36, the cylindrical polar magnet 45 moves out of the magnetic influence of the retainer toroid 44 and the magnetic field (not illustrated) associated with the cylindrical polar magnet 45 extends upward to the magnetic indicator ball 46.

Because the magnetic field associated with the cylindrical polar magnetic 45 is of the same polarity as the outward facing pole of the first polar ball magnetic 70, the first ball magnet 70 is repelled when the plunger 38 is in its upward position. This repulsive force causes the magnetic indicator ball 46 to rotate until the first polar ball magnet 70 is oriented upward and the second polar ball magnet 72 is oriented downward. At this point, because the outward facing pole of the second polar ball magnet 72 is opposite in polarity to the magnetic field associated with the cylindrical polar magnet 45, the second polar ball magnet 72 is held in a downward oriented position by the cylindrical polar magnet 45 while the plunger 38 remains in its upward position. After the pin 84 has passed the device 12, the plunger 38 returns, under force exerted by the spring 48, to its initial lower position. But even after the cylindrical polar magnet 46 is lowered so it is again encircled by the retainer toroid 44 and its magnetic field no longer reaches the second polar ball magnet 72, attraction of the second polar ball magnet 72 to the area 76 prevents the magnetic indicator ball 46 from rotating back to its original position, i.e. with the black colored upper half 80 visible through the dust cover 20.

Thus, after an indicator pig 84 has passed through the pipeline 10, the yellow lower half 78 of the magnetic indicator ball 46 is visible through the dust cover 60 and will remain visible until the magnetic indicator ball 46 is rotated back by means of the attached reset lever 69 to its original position.

Alternately, in another embodiment of the present invention, the cap assembly 56 can be modified to provide an electrical, rather than a visual, indication of the passage of the pig 84. In this alternate embodiment, the magnetic indicator ball 46 is replaced with a proximity switch (not illustrated) which is a magnetically activated electronic switch and the area 76 is eliminated. When the pig 84 causes the plunger 38 to move to its upward position, the cylindrical polar magnet 45 approaches and causes the proximity switch (not illustrated) to be activated. The proximity switch (not illustrated) can be used to operate recording devices (not illustrated) located at either the signaling device 12 or located remotely. The recording devices may be selected from many different types of recorders, signals, etc.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A device for signaling passage of a pig through a pipeline from either direction of the pipeline, comprising:

means for securing and sealing the device to the pipeline;

the device being provided with means defining a chamber which communicates with an interior area provided in the pipeline, the chamber having an upper end;

a plunger being movably provided in the chamber, means to bias said plunger downward toward the pipeline;

a lower actuator end of said plunger being provided with an actuator, means for movably retaining said actuator in said chamber so as to extend beyond a lower end of said chamber, said actuator being movable upward by engagement with the pig as the pig travels past the device while moving through the pipeline, said plunger being movable upward in unison with said actuator;

an upper magnetic end being provided on the plunger opposite the actuator end, a polar magnet being provided on said upper magnetic end;

the device being provided with a rotatable magnetic indicator ball adjacent the magnetic end of the plunger, and including means whereby an upward facing half of the magnetic indicator ball is visible;

retainer toroid means being provided in said means determining said chamber so as to surround the polar magnet when the plunger is biased downward for preventing a magnetic field of the polar magnet from reaching the magnetic indicator ball;

a lower half of the magnetic indicator ball being visually distinct from an upper half of the magnetic indicator ball;

means for providing a magnetic pole of one magnetic polarity on said lower half and a magnetic pole of opposite magnetic polarity on said upper half, said lower half being of like magnetic polarity to the polar magnet so that the lower half is repelled by the polar magnet when the polar magnet approaches the lower half;

means for rotatably supporting said magnetic indicator ball removably attached to said means defining said chamber near said chamber upper end;

means to reset the magnetic indicator ball; and means provided on the device to discourage rotation of the magnetic indicator ball.

2. A device according to claim 1 wherein said means to bias said plunger downward comprises a spring being provided around said plunger, one end of said spring being fixed in said chamber upper end and an opposite end of the spring abutting a seal provided adjacent the piston's lower actuator end.

3. A device according to claim 1 wherein said mean for removably retaining said actuator is a pin, said pin retaining said actuator and said plunger within said chamber.

4. A device according to claim 1 wherein the lower half of the magnetic indicator ball is of one color and the upper half of the magnetic indicator ball is of a different, contrasting color.

5. A device according to claim 1 wherein the means for providing opposite magnetic poles on the upper and lower halves of the magnetic indicator ball comprises a first polar ball magnet located on the lower half and a second polar ball magnet located on the upper half, a bar of magnetic material extending through the magnetic indicator ball between the first and second polar ball magnets, said polar ball magnets being oriented so their like magnetic poles are oriented in the same direction and each polar ball magnet being oriented so one of its magnetic poles faces outward from the magnetic indicator ball.

6. A device according to claim 5 wherein said means for rotatably supporting said magnetic indicator ball includes:

an ear being attached to one side of the magnetic indicator ball and a lever arm being attached to an opposite side of the magnetic indicator ball so that the ear and lever arm are perpendicular to the bar.

7. A device according to claim 6 wherein said means to reset the magnetic indicator ball is a reset lever attached to said lever arm.

8. A device according to claim 7 wherein said upper and lower halves are located on said magnetic indicator ball so that they form an interface where they meet, said interface intersects said ear and the lever arm and is perpendicular to said bar.

9. A device according to claim 1 further comprising an area of magnetic material provided between said polar magnet and said magnetic indicator ball as said means to discourage rotation of said magnetic indicator ball.

10. A device for signaling passage of a pig through a pipeline from either direction of the pipeline, comprising:

a nipple secured to the pipeline and communicating with an interior area provided in the pipeline;

a plug assembly securing to and sealing with the nipple;

the plug assembly being provided with a chamber, said chamber communicating with the interior area of the pipeline;

a plunger being movably retainer within the chamber;

a lower actuator end of said plunger being provided with an actuator, means for movably retaining said actuator in said chamber so as to extend beyond a lower end of said chamber, said actuator being movable upward by engagement with the pig as the pig travels past the device, said plunger being movably upward in unison with the actuator;

an upper magnetic end being provided on the plunger opposite the actuator end, a polar magnet being provided on the upper magnetic end;

means to bias said plunger downward toward the pipeline, retainer toroid means being provided in said plug assembly so as to surround the polar magnet when the plunger is biased downward for preventing a magnetic field of the polar magnet from reaching the magnetic indicator ball;

a cap assembly securing to the nipple adjacent the magnetic end of the plunger;

a magnetic indicator ball and means for rotatably mounting said magnetic indicator ball within an internal cavity provided in the cap assembly;

the cap assembly being provided with means for viewing an upward facing half of the magnetic indicator ball, a lower half of the magnetic indicator ball being visually distinct from an upper half of the magnetic indicator ball;

the lower half being of like magnetic polarity with the polar magnet and of opposite magnetic polarity to the upper half;

means for resetting the magnetic indicator ball; and means provided on the device to discourage rotation of the magnetic indicator ball.

11. A device according to claim 10 wherein said means for rotatably mounting said magnetic indicator ball includes a lever arm attached to one side of said magnetic indicator ball and an ear attached to an opposite side of said magnetic indicator ball, said lever arm being provided with a reset lever as said means for resetting said magnetic indicator ball.

* * * * *